US008938846B2

(12) United States Patent
Bichler (10) Patent No.: US 8,938,846 B2
(45) Date of Patent: Jan. 27, 2015

(54) SCREEN WIPER ARRANGEMENT (75) Inventor: Oliver Bichler, Pluwig (DE)

(73) Assignee: Volvo Construction Equipment AB, Eskilstuna (SE)

( * ) Notice: Subject to any disclaimer, the term of this patent is extended or adjusted under 35 U.S.C. 154(b) by 349 days.

(21) Appl. No.: 13/388,477

(22) PCT Filed: Aug. 13, 2009

(86) PCT No.: PCT/SE2009/000377
§ 371 (c)(1),
(2), (4) Date: Feb. 2, 2012

(87) PCT Pub. No.: WO2011/019305
PCT Pub. Date: Feb. 17, 2011

(65) Prior Publication Data
US 2012/0138090 A1    Jun. 7, 2012

(51) Int. Cl.
B60S 1/04 (2006.01)
B60S 1/08 (2006.01)
B60S 1/02 (2006.01)

(52) U.S. Cl.
CPC .. B60S 1/08 (2013.01); B60S 1/026 (2013.01); B60S 1/0466 (2013.01); Y10S 318/02 (2013.01)
USPC .................. 15/250.05; 15/250.001; 15/250.3; 318/DIG. 2; 219/203; 296/96.15; 296/96.2

(58) Field of Classification Search
CPC ..... B60S 1/0466; B60S 1/0818; B60S 1/0862
USPC ............... 15/250.05–250.09, 250.16, 250.17, 15/250.001, 250.19, 250.3, 250.31; 296/96.15, 96.13, 96.2; 219/202, 203; 318/DIG. 2
See application file for complete search history.

(56) References Cited

U.S. PATENT DOCUMENTS

| 4,091,494 A | 5/1978 | Dunhill et al. |
| 5,079,793 A * | 1/1992 | Isii ............................ 15/250.19 |
| 5,512,806 A | 4/1996 | Papazian et al. |
| 5,722,108 A | 3/1998 | Sakyo et al. |

(Continued)

FOREIGN PATENT DOCUMENTS

| CN | 101214810 A | 7/2009 |
| GB | 353336 A | 7/1931 |

OTHER PUBLICATIONS

International Search Report for corresponding International Application PCT/SE2009/000377.

(Continued)

Primary Examiner — Gary Graham
(74) Attorney, Agent, or Firm — WRB-IP LLP (57) ABSTRACT A screen wiper arrangement is provided including a window screen and a screen wiper for cleaning the window screen, wherein the window screen is arranged in an opening of a cabin and inserted in a window frame, and wherein the window screen includes at least one screen portion which can be moved between an open and a closed position. The window screen includes an electrically conductive element coupleable to an electrical circuit which has at least a first state in response to a first position of the at least one screen portion and a second state in response to a second position of the at least one screen portion. One or more contact points are available for detecting if the electrical circuit is in the first or the second state, and a wiper control element is provided which controls the activation of the screen wiper system.

14 Claims, 6 Drawing Sheets

(56) References Cited

U.S. PATENT DOCUMENTS

| | | |
|---|---|---|
| 6,240,593 B1 | 6/2001 | Murata |
| 6,523,882 B2 * | 2/2003 | Ishikawa et al. ............ 296/146.8 |
| 8,652,264 B2 * | 2/2014 | Peterson et al. .................. 134/6 |
| 8,857,883 B2 * | 10/2014 | Kargilis et al. ................. 296/56 |
| 2004/0124664 A1 * | 7/2004 | McClure et al. ............ 296/146.8 |

OTHER PUBLICATIONS

JP6156069 (A)—Jun. 3, 1994; Yutani Juko KK (document and English abstract).

International Preliminary Report on Patentability for corresponding International Application PCT/SE2009/000377.

Chinese Official Action (Oct. 28, 2014) for corresponding Chinese Application 200980160921.1.

* cited by examiner

SCREEN WIPER ARRANGEMENT

BACKGROUND AND SUMMARY

The invention relates to a screen wiper arrangement comprising a window screen and a screen wiper for cleaning the window screen and a method for operating the screen wiper arrangement.

It is known in the art that cabins of e.g. mobile or stationary construction equipment and working machines have a window screen with a screen portion which can be moved with respect to a fixed screen portion. When the movable screen portion is in its open position, the screen wiper would be damaged when started or operated in such a case.

JP 6156069 discloses a device which detects if the front window of an excavator is closed or open. A sensor is arranged in an actuator device located in a movable arrangement provided for opening or closing the window screen. When the window screen is open it is impossible to start the wiper.

GB 353366 A discloses a screen wiper arrangement comprising a window screen and a screen wiper for cleaning the window screen which is arranged in an opening of a cabin and inserted in a window frame. The window screen can be moved between an open and a closed position. A wiper motor is arranged at the window screen An electrically conductive element in form of a contact pin is arranged at the casing of the wiper motor which opens or closes an electrical circuit between a battery and the wiper motor depending on the position of the window screen. The contact pin makes mechanical and electrical contact to a spring element in order to establish an electrical connection between the vehicle battery and the wiper motor when the window screen is closed.

It is desirable to provide a screen wiper arrangement which prevents the action of a screen wiper independent of an actuator device for moving a movable window screen.

It is also desirable to provide a method for operating such a screen wiper arrangement.

A screen wiper arrangement is proposed comprising a window screen and a screen wiper system for cleaning the window screen, wherein the window screen is arranged in an opening of a cabin and inserted in a window frame, and wherein the window screen comprises at least one screen portion which can be moved between an open and a closed position. The window screen comprises an electrically conductive element coupleable to an electrical circuit which has at least a first state in response to a first position of the at least one screen portion and a second state in response to a second position of the at least one screen portion. One or more contact points are available for detecting if the electrical circuit is in the first or the second state, and a wiper control element is provided which controls the activation of the screen wiper system depending on the actual state of the electrical circuit.

The electrically conductive element is electrically coupleable to a first contact point and a second contact point arranged in operational connection with the at least one screen portion. The electrically conductive element can be embodied as a simple wire attached to, or a conductive thin film deposited onto, the at least one screen portion. The two contact points can be electrically connected to each other by the electrical conductive element when the screen portion comprising the electrically conductive element is placed on the appropriate location.

In a favourable embodiment according to the invention, the electrically conductive element can be an inductor. The position of the at least one screen portion can be detected without physical contact between the one or more contact points and the electrically conductive element.

A major achievement of the invention is that the actual position of the at least one screen portion is reliably detectable and that an activation of the screen wiper system is automatically prevented in case it is detected that the at least one screen portion is in a position wherein the screen wiper could be damaged if operated.

The screen wiper system comprises usually a screen wiper and an integrated washer. In cases where the screen wiper and the washer shall not be operated when said at least one screen portion is (partly or completely) open, according to the invention a screen wiper movement and/or emission of water from the washer integrated in the screen wiper system is triggered accordingly so that no water is emitted and the screen wiper does not move when the at least one screen portion is in an open position.

Advantageously, the at least one screen portion can be moved manually or by way of an actuator. A separate voluminous equipment for detecting whether the at least one screen portion is in its closed position can be avoided. The one or more contact points used according to the invention can be kept small and can be arranged at unobtrusive positions, for instance integrated in a window frame or a guide for the at least one screen portion.

The electrically conductive element used according to the invention can be easily detected by a counterpart being responsive to the actual position of the at least one screen portion. The electrically conductive element can be a wire, a thin-film layer, an electric component, particularly an inductor, and the like. The counterpart can be a contact pad which engages the electrically conductive element when the at least one screen portion is in an appropriate position. The counterpart can be a detector which detects the presence and/or absence of the at least one screen portion at an appropriate position.

In a favourable embodiment according to the invention, any temporary intermediate positions of the at least one screen portion between the first and second position which the at least one screen portion will pass during its movement between the first and second position, and/or any permanent intermediate position between said first and second position, can be assigned to one of the two states of the electrical circuit. By identifying intermediate positions of the at least one screen portion it can be easily detected if the at least one screen portion is started to be opened, thus allowing a reliable inhibition of the operation of the screen wiper system or even an interruption of an ongoing screen wiper system operation. This is particularly useful in case that the opening and closing of the at least one screen portion is not done manually but (unintentionally) by electrical actuation.

In a favourable embodiment according to the invention, the one or more contact points can be arranged at a first frame portion corresponding to the at least one screen portion in its closed state. In this case, the contact points interact with the at least one screen portion when the at least one screen portion is in its closed position.

Additionally or alternatively, the one or more contact points can be arranged at a second predefined location, for instance a frame portion or another stowing-away position of the at least one screen portion, corresponding to the open state of the at least one screen portion. The stowing-away position can be at a predefined location of the chassis, for instance at the door and the like. In this case, the contact points interact with the at least one screen portion when the at least one screen portion is in its open position.

Generally, there can be a combination of contact points at the first frame portion and the second location. In all three cases, the electric circuit can change its state, for instance being open, closed or changing its electrical resistance. The electrical circuit can also be employed for other purposes in the cabin, and the position of the one or more contact points can be adapted to the requirements of the electric circuit.

In a favourable embodiment according to the invention, the electrically conductive element can be an electrically conductive wire. An electric wire can be easily attached to the at least one screen portion.

In a favourable embodiment according to the invention, the electrically conductive element can be electrically coupleable to a first contact point and a second contact point arranged in operational connection with the at least one screen portion. The electrically conductive element can be embodied as a simple wire attached to, or a conductive thin film deposited onto, the at least one screen portion. The two contact points can be electrically connected to each other by the electrical conductive element when the screen portion comprising the electrically conductive element is placed on the appropriate location.

In a favourable embodiment according to the invention, the electrically conductive element can be integrated in an electric window heater arranged at the window screen. Particularly, the electrically conductive element can be a conductive path integrated in an electric window heater arranged at the at least one screen portion. The detection whether the window screen is closed or open can comfortably be integrated in an electric equipment which is already integrated in the window screen.

In a favourable embodiment according to the invention, a voltage drop measured between a first and a second contact point can have a lower value when the at least one screen portion is in its closed position and can have a higher value when the at least one screen portion is in its open position or started to be opened.

Particularly, the electric circuit can be closed by the electrically conductive element of the at least one screen portion when the at least one screen portion is in its closed position and open when the when the at least one screen portion is in its open position or started to be opened. When the at least one screen portion is in its closed position, the electrically conductive element can form an electric connection between the two contact points. The position of the at least one screen portion changes the electrical properties, e.g. the electrical resistance or another state of the electric circuit, in a well defined way which can easily monitored.

Alternatively, in a favourable embodiment according to the invention, a voltage drop measured between a first and a second contact point can have a higher value when the at least one screen portion is in its closed position and can have a lower value when the at least one screen portion is in its open position or started to be opened. Particularly, the electric circuit can be open when the at least one screen portion is in its closed position and closed when the at least one screen portion is in its open position. As already mentioned before, the change of the electrical properties of the electric circuit according to the actual position of the at least one screen portion can be easily detected.

In a favourable embodiment according to the invention, the electric circuit can comprise a radio frequency receiver responsive to the inductor. Favourably, the electrically conductive element can be embodied as an RFID tag (Radio Frequency Identification tag). As it is known from the prior art RFID tags can be brought into wireless operational contact with corresponding high frequency transmitter, receiver or transceiver systems which are adapted or adaptable to the RFID tag used (or vice versa using RFID tags which are adapted or adaptable to the system used). The electric circuit can easily detect the presence or absence of the inductor or the RFID tag.

According to another aspect of the invention, a method is proposed for operating a screen wiper arrangement for a window screen according to anyone of the above described features, wherein an activation of a screen wiper is blocked or allowed depending on an actual state of an electric circuit coupled to an electrical conductive element arranged at the window screen. Favourably, the screen wiper system can be protected in a reliable and comfortable way against damage when the movable screen portion is open or started to be opened.

The invention is particularly useful for mobile or stationary work machines or construction equipment with cabins such as wheel loaders, haulers, excavators, dumpers, pipe layers, etc.

BRIEF DESCRIPTION OF THE DRAWINGS

The present invention may best be understood from the following detailed description of the embodiments and Figures related thereto, but not restricted to these embodiments and Figures, wherein is shown schematically.

DETAILED DESCRIPTION

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
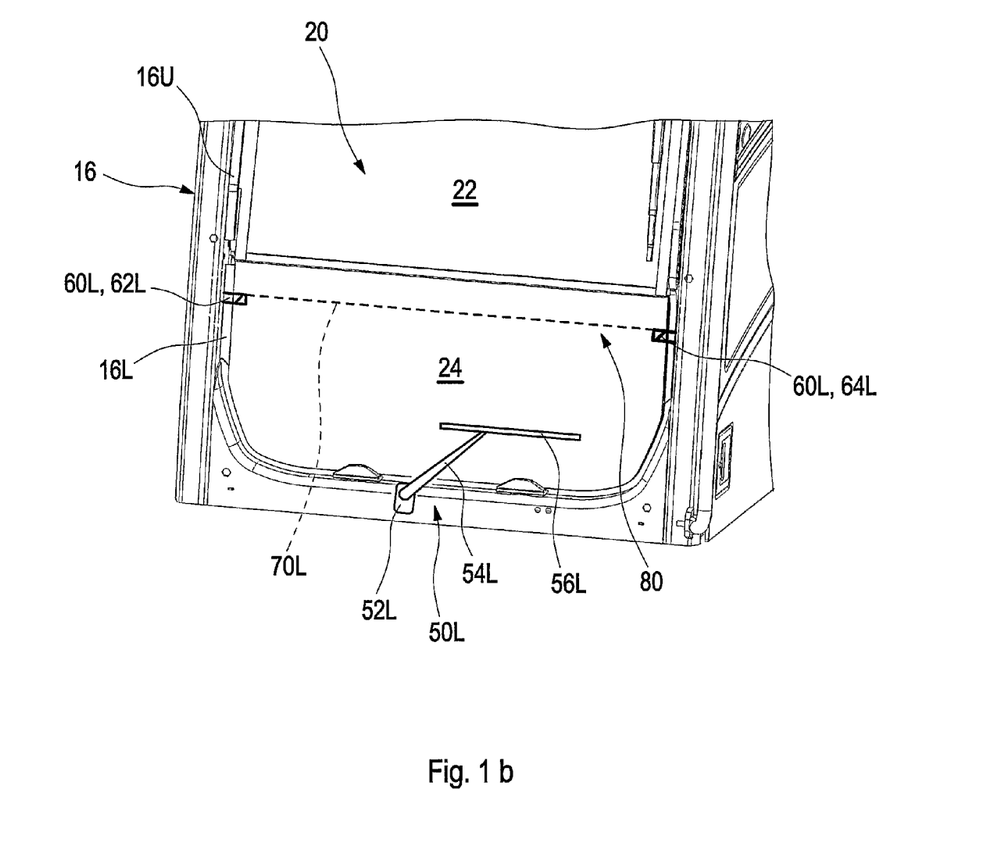
FIGS. 1a, 1b an example embodiment of a screen wiper arrangement on a cabin with a window screen according to the invention (FIG. 1a), and a detail of the window screen with a first example embodiment of an electric conductive element constituted by a wire according to the invention (FIG. 1b)
Figure 1A:
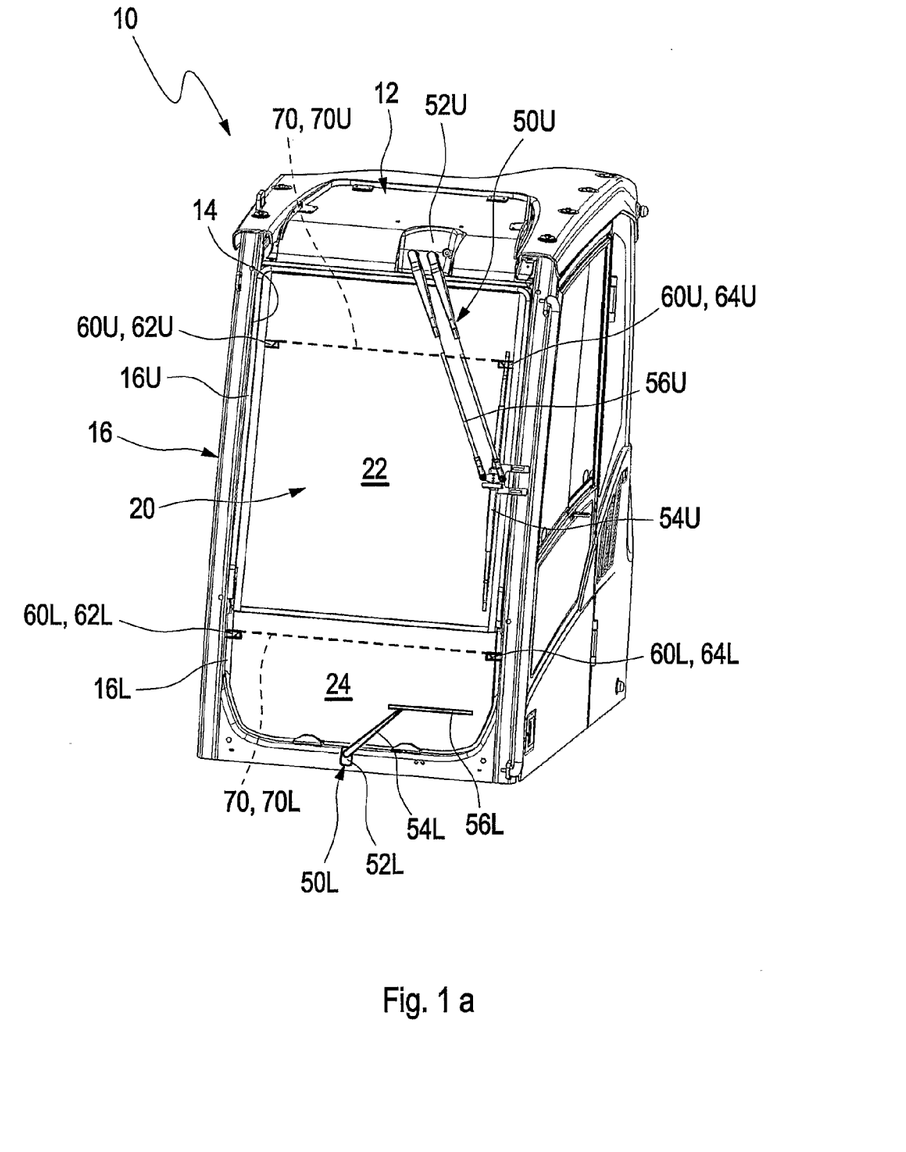
Figure 6:
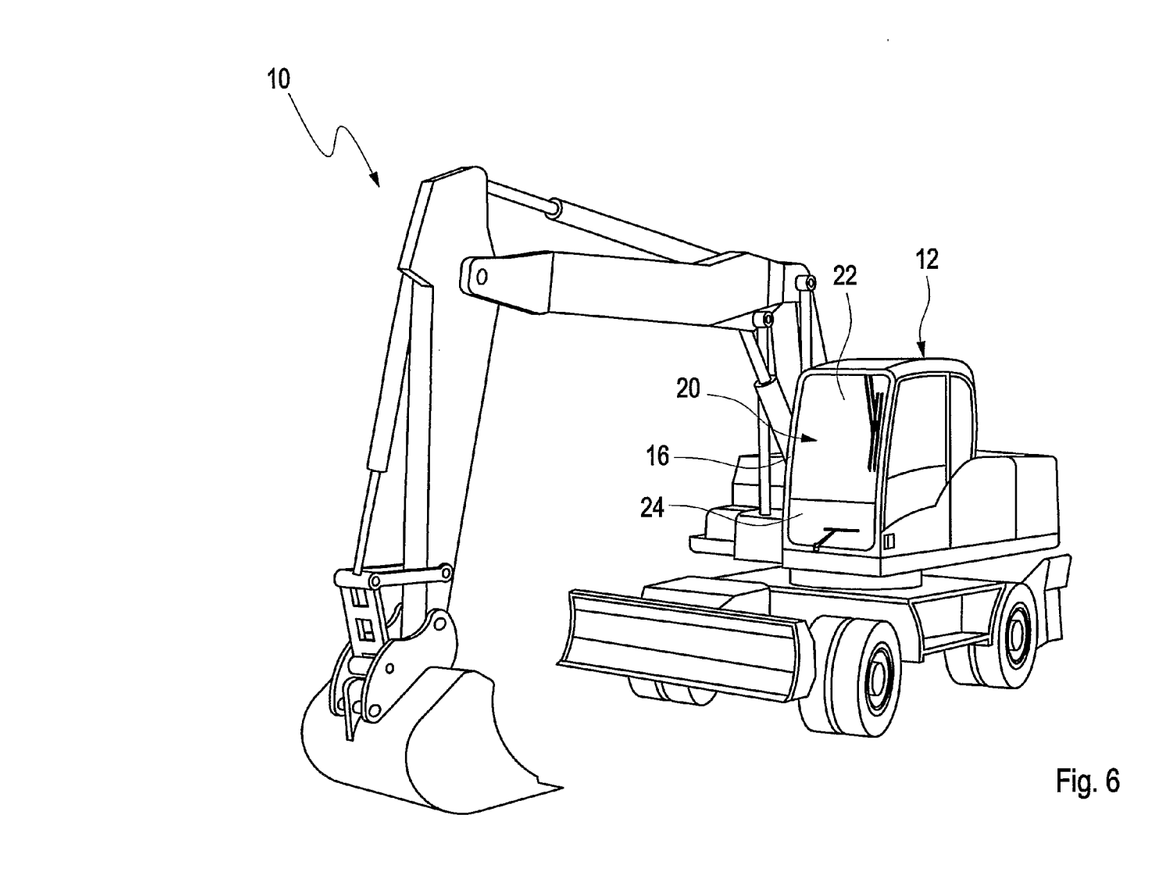
FIG. 6 an example embodiment of a construction machine comprising a screen wiper arrangement according to the invention.

In a first embodiment of the invention, FIGS. 1a and 1b depict schematically a cabin 12 of a work machine 10 (FIG. 6). A screen wiper arrangement comprises by way of example a window screen 20 composed of or comprising an upper screen portion 22 and a lower screen portion 24 and a first, upper screen wiper system 5OU for cleaning the upper screen portion 22 and a second, lower screen wiper system 5OL for cleaning the lower screen portion 24 of the window screen 20. The window screen 20 covers an opening 14 of a cabin 12 and is inserted in a window frame 16 with an upper frame portion 16U and a lower frame portion 16L.

The window screen 20 comprises an electrically conductive element 70 which can be connected to an electrical circuit 80. The electrical conductive element 70 can be an ohmic resistor, such as a conductive wire, an inductor or an RFID tag.

Figure 2:
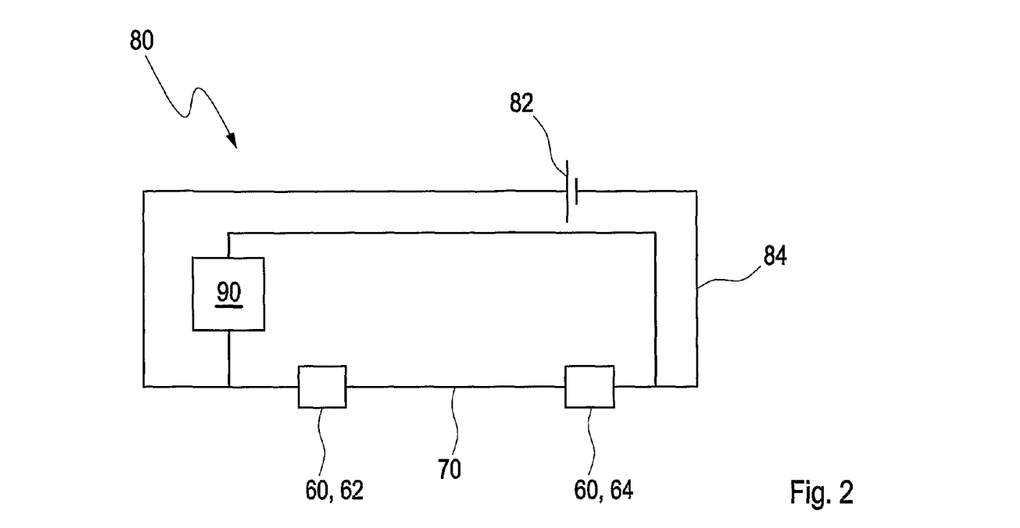
FIG. 2 a first electric circuit according to the invention to which a window portion is connectable with a wire.
Figure 3:
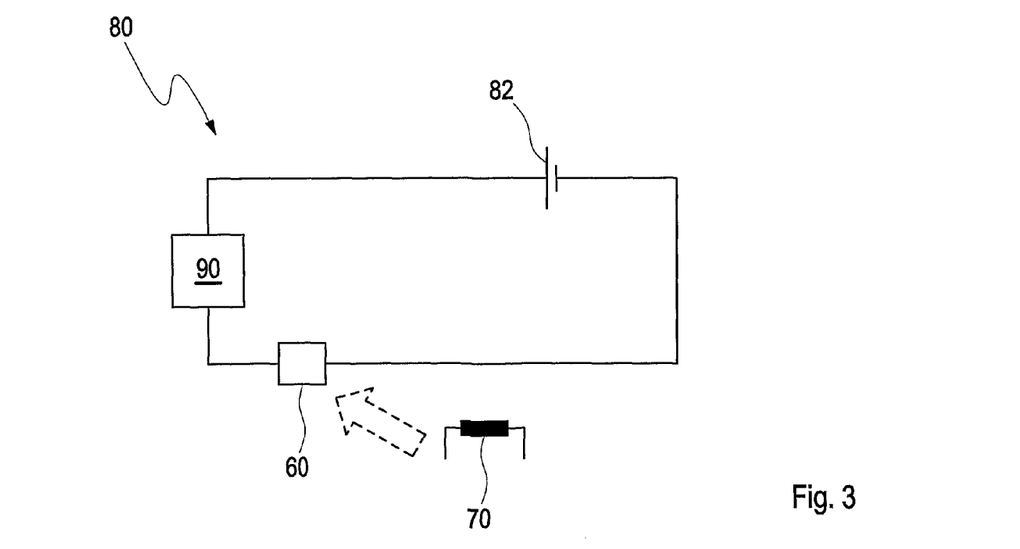
FIG. 3 a second electric circuit according to the invention to which a window portion is coupleable with an inductor.

Two embodiments of electric circuits 80 are shown in FIGS. 2 and 3, to which the electrically conductive element 70 makes contact by two contact points 62, 64. In the present embodiment shown in FIGS. 1a, 1b, the conductive element 70 and the two contact points 62, 64 are denoted with a U if they relate to the upper screen portion 22 and with an L if they relate to the lower screen portion 24. Further, in the present embodiment shown in FIGS. 1a, 1b, when the corresponding electrically conductive element 70; 7OU or 7OL is not in electrical contact with the two corresponding contact points 62, 64; 62U, 64U or 62L, 64L, the corresponding movable screen portion 22 or 24 is not in its closed position and, consequently, an activation of the corresponding wiper blade 54; 54U or 54L has to be prevented (and is prevented according to the invention as discussed further below). The electrically conductive element 70 can be arranged at the lower screen portion 24 only (not shown) or at the upper screen portion 22 only (not shown) or at both screen portions 22 and 24 shown as element 7OL at the lower screen portion 24 and as element 7OU at the upper screen portion 22.

In the example embodiment shown in FIG. 1, both the upper screen portion 22 and the lower screen portion 24 are provided with an electrical conductive element 70, which is in contact with contact points 6OU, 6OL when the respective screen portion 22, 24 is in its closed position. Particularly, an electrical conductive element 7OU is assigned to the upper screen portion 22 and an electrical conductive element 7OL is assigned to the lower screen portion 24. The electrical conductive elements 7OU, 7OL are in contact with the contact points 6OU, 62U, 64U and 6OL, 62L, 64L, respectively.

The lower screen portion 24 can be opened, particularly completely removed from the lower frame portion 16L and stored at an appropriate place preferably inside the cabin 12.

For opening the upper screen portion 22 in the upper frame portion 16U the upper screen portion 22 can be tilted or pivoted around a horizontal axis parallel to the upper horizontal part of the frame 16 and moved in sliding guides (not shown) in the upper frame portion 16U underneath the top of the cabin 12. When the upper screen portion 22 is tilted or pivoted the contact points 62U, 64U are no longer in electrical contact with the electrical conductive element 70, 7OU, such as the connection wire, or, in the case of an electrical conductive element in form of a inductor, the measured field strength at the contact point will decrease as soon as the screen portion 22 is opened, i.e. tilted outwardly.

At the upper part of the cabin 12 a holder 56U of the upper screen wiper system 5OU is provided that can move a wiper blade 54U over the upper screen portion 22 by action of a wiper motor 52U that is connected to the holder 56U and attached at the cabin's top. The screen wiper system 5OU may also comprise a water spray valve (not shown).

The lower screen wiper system 5OL is composed in a similar manner as described above for the upper screen wiper system 5OU, whereas the wiper motor 52L may be attached below the lower frame portion 16L.

In the present embodiment shown as detail in FIG. 1b for the lower screen portion 24, the electrically conductive element 7OL is by way of example a wire across the lower screen portion 24 that is in contact with the two contact points 62L, 64L, if the lower screen portion 24 is closed. The electrical conductive element 7OL can be an ohmic resistor, for instance a metal wire. The voltage drop measured across the wire 7OL between the two contact points 62L, 64L indicates whether the lower screen portion 24 is in its closed position, and the screen wiper 5OL can be set in action or whether the lower screen portion 24 is not in its closed position, and activation of the screen wiper 5OL must be prevented (and is prevented according to the invention as discussed further below). In case the lower screen portion 24 is not in the closed position, the ohmic resistance between the two contact points 62L, 64L is infinite, and it is finite when the screen portion 24 is in its closed position.

The same applies for the upper screen portion 22 with its electrically conductive element 7OU (for instance in form of a wire) when being in contact with, or disconnected from, the upper contact points 62U, 64U.

Two embodiments of electric circuits 80 to which the electrically conductive element 70 can be coupled are indicated in FIGS. 2 and 3. The electrical circuit 80 has at least a first state in response to a first position of the respective screen portion 22, 24 and a second state in response to a second position of the respective screen portion 22, 24. Activation of the respective screen wiper system 5OL, 5OU can be accordingly prevented or allowed.

The electric circuit 80 in FIG. 2 comprises the two contact points 62, 64, the electrically conductive element 70 when in place (meaning being electrically connected to the two contact points 62, 64), for instance in form of an ohmic resistance such as a wire or a conductive layer, an electric power source 82, wiring connections 84 connecting the elements of the electrical circuit 80 and a control device 90 which detects the ohmic resistance between the two contact points 62 and 64 by measuring the voltage drop in between. When the electrically conductive element 70 is in place, i.e. connected to the two contact points 62 and 64, the voltage drop corresponds to the resistivity of the electrical path between the two connection points of the control device 90, including the two contact points 62, 64 and the electrically conductive element 70. When the electrically conductive element 70 is electrically disconnected from the two contact points 62 and 64, the voltage drop indicates that the electric circuit 80 is open. The control device 90 is connected to another control device (not shown) controlling the operation of the screen wiper system 50 (FIGS. 1a, 1b) which prevents the activation of the screen wiper 54 if the respective screen portion 22 and/or 24 is detected to be open or started to be opened (or, if the screen wiper system 50 is already in operation, it forces the screen wiper 54 to return to its neutral position where the opening of the screen portion 22 or 24 related thereto will not damage the screen wiper system 50).

FIG. 3 depicts an embodiment of the electric circuit where only one contact point 60 is provided for the respective screen portion 22, 24. In this embodiment, the electrically conductive element 70 can be an inductor which alters an alternating electric field sensed in the contact point 60 such as a radio frequency field or the like. The inductivity of the electrical circuit 80 is different depending on whether the electrically conductive element 70 is close to the contact point 60 or not. As above, a contact point 60 can be arranged at the lower frame portion 16L, at the upper frame portion 16U or at both frame portions 16L, 16U for interacting with the electrically conductive element 70 of the respective screen portion 22, 24.

In case the contact point 60 is arranged at the lower frame portion 16L1 the inductance (i.e. the electrically conductive element 70) is coupled to the electric circuit 80 via the contact point 60 when the lower screen portion 24 is closed and decoupled when the lower screen portion 24 is open. On the other hand, in case the contact point 60 is arranged at the upper frame portion 16L, the inductance (i.e. the electrically conductive element 70) is coupled to the electric circuit 80 via the contact point 60 when the upper screen portion 22 is closed and decoupled when the upper screen portion 22 is opened. When contact points 60 are arranged at both frame portions 16L, 16U it has to be distinguished, e.g. by the control device 90, which contact point 60 is actually related to which inductor (i.e. the electrically conductive element 70) and, for each one of the contact points 60, whether it is coupled or decoupled to the respective inductor 70.

In this embodiment of the invention, where inductors are used as electrically conductive elements 70, the detected electrical field changes gradually when the inductor 70 (electrical conductive element 70) is gradually moved away from the corresponding contact point 60 when the respective screen portion 22 or 24 is opened. This means that a certain threshold level of the electrical field strength has to be defined in advance when configuring the electric circuit 80 and its communication with the screen wiper control system 50. When opening the respective screen portion 22 or 24, the value of the actual strength of the electrical field measured at the contact point 60 will pass this threshold level to lower field strength values when the respective screen portion 22 or 24 (and correspondingly the respective inductor 7OL or 7OU) are moved away a certain distance from the contact point 60 during the opening of the respective screen portion 22 or 24. If the value of the actual field strength measured at the contact point 60 has passed the threshold level, the state of the respective screen portion 22 or 24 is deemed not to be closed and the control device 90 sends a corresponding control signal to the other control device (not shown) controlling the operation of the screen wiper system 50 that in turn will prevent the screen wiper system 50 from being started. If the screen wiper system 50 is already in operation, the control device forces the wiper 54 to return to its neutral position where the opening of the screen portion 22 or 24 related thereto will not damage the screen wiper system 50. Further, if applicable, also the operation of the washer, i.e. water ejection, can be blocked or, when already running, interrupted. All this can be initiated either immediately after the detection of the value of the electrical field strength, passing the predetermined threshold level or, alternatively, by finalizing in the normal way the ongoing current movement cycle of the wiper 54 concerned. However, the water ejection should be stopped immediately, irrespective of whether the wiper 54 is stopped immediately, too, or whether it is allowed to finalize its ongoing current movement cycle.

Figure 4:
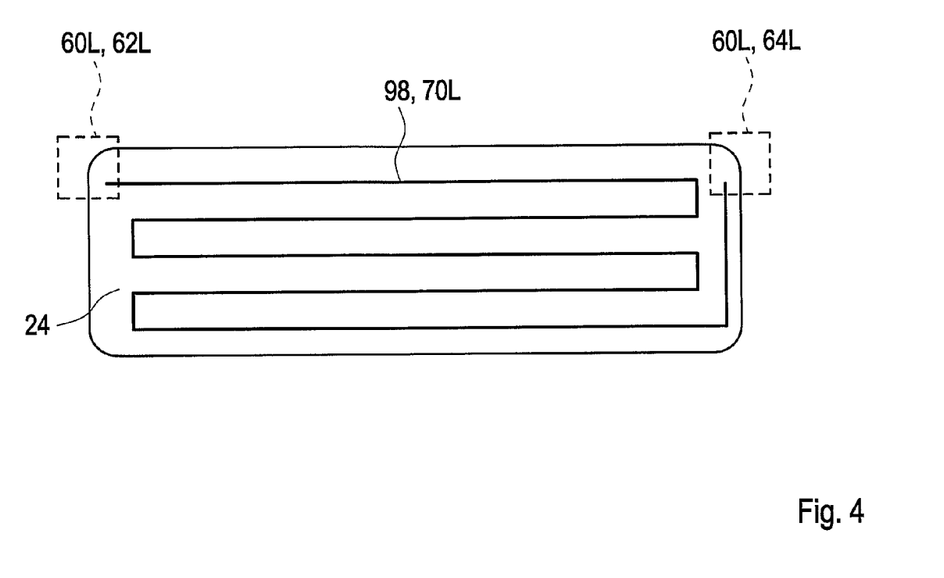
FIG. 4 a second example embodiment of a wind screen according to the invention comprising a window heater.

An alternative embodiment of an electrically conductive element 70 coupled to the upper and/or lower screen portion 22, 24 is illustrated in FIG. 4. The electrically conductive element 70 constitutes a portion of the electrical connection of a window heater 98 arranged at the window screen 20, particularly at the upper and lower screen portions 22, 24.

With respect to the lower screen portion 24, in case the contact points 62L, 64L are arranged at the upper part of the lower frame position 16L (see FIGS. 1a, 1b) corresponding to the closed position of the lower screen portion 24, the heater wire of the window heater 98 (element 7OL) in the geometrical arrangement as shown in FIG. 4 is in contact with the contact points 62L, 64L only when the lower screen portion 24 is closed.

For heating up the window heater 98 arranged in the lower screen portion 24, the window heater 98 has to contact a power supply (not shown). The contact points 62L, 64L can provide contact to the power supply for the heater wires and electrically connect the window heater 98 to its power supply. The contact points 62L, 64L can be included into fixing parts of the window screen 20. The contact points 62L, 64L connect the current circuit of the window screen 20 and the main power supply for the window heater 98 coming from the cabin 12. Further, when the lower screen portion 24 is open and the lower screen wiper system 5OL is deactivated accordingly as a result of the change of the electrical properties of the electric circuit 80, it is possible to de-activate the screen wiper system 5OU of the upper screen portion 22 simultaneously, for instance to avoid water from the screen wiper system 5OU entering the cabin 12 through the open lower screen portion 24, and vice versa.

To close the lower screen portion 24 of the window screen 20, an operator must put the lower screen portion 24 into the fixing position at the frame 16. When the screen portion 24 is closed, the electrical circuit 80 is closed simultaneously by the electrical conductive element 7OL which is constituted by the window heater 98 when the electrical contact points 62L, 64L come into electrical contact with the window heater 98 of the lower screen portion 24. A change in the resistivity of the electrical circuit 80 (FIG. 2), e.g. from an open circuit to a closed circuit, can be easily determined corresponding to an open or closed state of the lower screen portion 24. With the result of this measurement it is possible to switch off the wiper function if the lower screen portion 24 is not fixed in its closed position, and switched it on if the lower screen portion 24 is in a correct closed position.

Likewise, when the contact points 62U, 64U are arranged at the upper second frame position 16U (FIGS. 1a, 1b) corresponding to the upper screen portion 22, the heater wire of the window heater 98 is in contact with the contact points 62U, 64U only when the upper screen portion 22 is closed, and, therefore, it can be monitored accordingly whether the upper screen portion 22 is open or closed.

Figure 5:
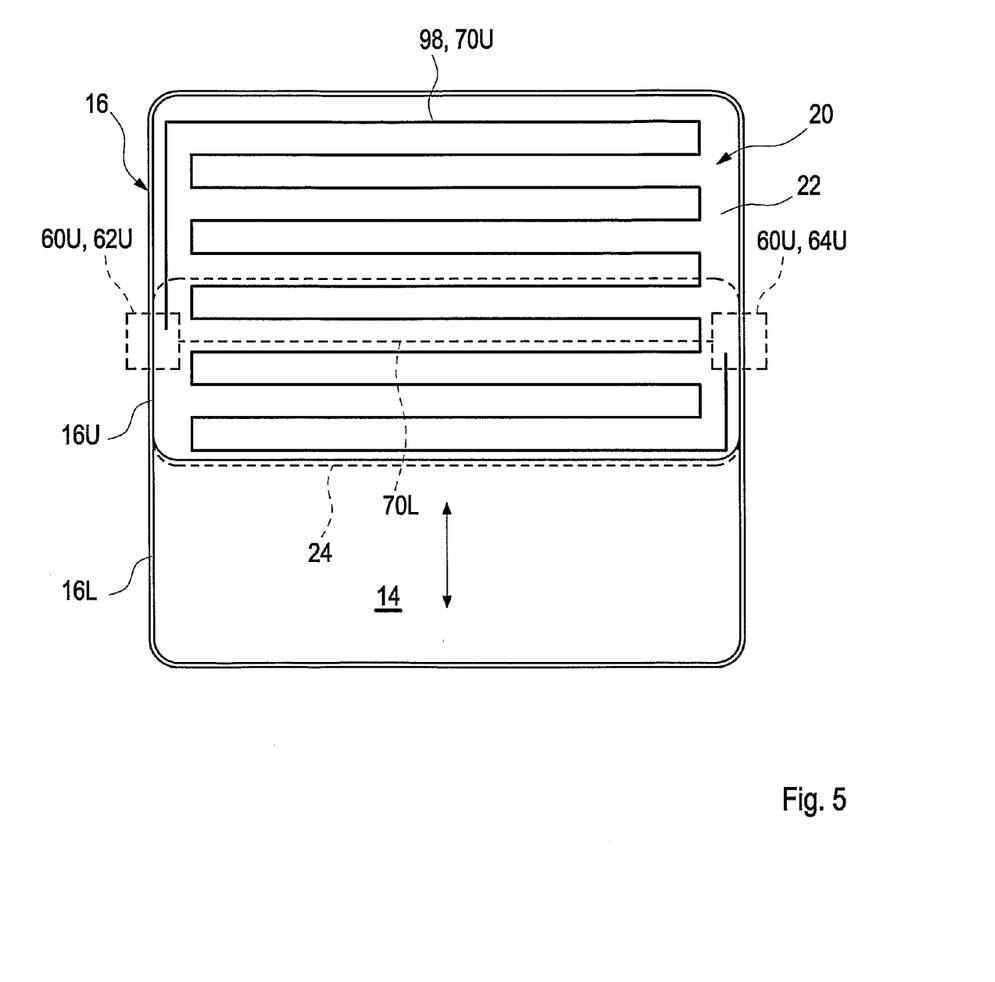
FIG. 5 an example embodiment of a window screen according to the invention comprising two movable window portions.

FIG. 5 depicts an alternative embodiment where an electrical circuit 80 is permanently closed by wires of an electric window heater 98 arranged at one screen portion 22 or 24, by way of example at an upper screen portion 22.

Between the contact points 62U, 64U the resistance of the heater wires can be measured.

In this embodiment, the lower screen portion 24 can be moved over the upper screen portion 22 for its open position. When the lower screen portion 24 is in its open position, i.e. partly overlaying the upper screen portion 22, an electrically conductive element 7OL arranged at the lower screen portion 24 and formed as a conductive path connects to the contact points 62U; 64U when the lower screen portion 24 is brought into its open position. In this open position, this electrical connection 62U, 7OL, 64U alters the resistance between the contact points 62U, 64U by forming an electric connection in parallel to the heater wires (elements 7OU) which can easily be detected. Particularly, the electrical resistance measured between the two contact points 62U, 64U when the wires of the electric window heater 98 are connected in parallel to the electrically conductive element 7OL can be lower than the electrical resistance of the wires of the electric window heater 98 alone. In this case it is even possible to use an overcurrent protection of the heater power supply to switch off or on the wiper system 50 of the lower screen portion 24.

At least as soon as an operator in the cabin 12 switches on the screen wiper system 50 it is checked whether the control device 90 indicates the proper state of the electric circuit 80. If the state of the electric circuit 80 indicates that the upper and/or lower screen portion 22 is open, the wiper blade 54U and/or 54L (FIG. 1a) will not be set into motion by the wiper motor 52U, 52L, e.g. by preventing a electrical current flowing to the wiper motor 52U, 52L. If the state of the electric circuit 80 for instance indicates that the lower screen portion 24 is closed, electrical current is supplied to the wiper motor 52L, and the wiper blade 54L (FIG. 1a) starts working.

Even in case that the opening and closing of the at least one screen portion 22, 24 is not done manually but by electrical actuation, the invention provides a high reliability that the screen wiper system 50 is not operating with the screen portion 22, 24 open or started to be opened, wherein the electrical conductive element 70 can be a resistor or an inductive device. A typical situation when this can happen is if the screen wiper 50 system is running and the operator activates (perhaps unintentionally) the electrical actuation for opening one or both screen portions 22, 24.

In one embodiment (not shown) the electrical conductive element 70 can be a part of an electric circuit which, for instance, must be in a defined state in order to be able to move, i.e. to open the screen portion 22, 24. The defined state can be, for example that the electric circuit is closed or, alternatively, is open in order to be able to move, i.e. to open the screen portion 22, 24. The defined state can be a defined resistivity and/or a defined inductivity of the electric circuit and the like which is influenced by the electrical conductive element 70. If the required defined state is not fulfilled, the electrical activator cannot move the corresponding screen portion 22 or 24 related thereto. Alternatively or additionally, a logic coupled to the electrical actuator for moving the screen portion 22, 24 can check the actual state, i.e. if the respective screen portion 22, 24 is open or closed, depending on the actual presence or absence of the electrical conductive element 70. When the electrical actuator for moving the screen portion 22, 24 is activated, the logic prohibits or permits the movement of the screen portion 22, 24 depending on the result of the check.

FIG. 6 indicates an example of a movable construction equipment embodied as an excavator 10 which is equipped with a cabin having a window screen 20 consisting of or comprising an upper screen part 22 and a separate lower screen part 24. The window screen 20 is inserted in a frame 16 of the cabin 12. Such an excavator 10 is suited and can be adapted to employ the screen wiper arrangement according to the invention. For details how this is done reference is made to what has been said above.

Favourably, the operating comfort of the construction equipment is increased and the screen wiper system 50 saved from damage due to an open window.

The invention claimed is:

1. A screen wiper arrangement comprising a window screen and a screen wiper for cleaning the window screen, wherein the window screen is arranged in an opening of a cabin and inserted in a window frame, and wherein the window screen comprises at least one screen portion which can be moved between an open and a closed position, wherein
   (i) the window screen comprises an electrically conductive element coupleable to an electrical circuit which has at least a first state in response to a first position of the at least one screen portion and a second state in response to a second position of the at least one screen portion;
   (ii) one or more contact points are available for detecting if the electrical circuit is in the first or the second state; and
   (iii) a wiper control element is provided which controls the activation of the screen wiper system (50U, 50L) depending on the actual state of the electrical circuit, wherein the electrically conductive element is integrated in an electric window heater arranged at the window screen.

2. The screen wiper arrangement according to claim 1, wherein any temporary intermediate positions of the at least one screen portion between the first and second position which the at least one screen portion will pass during its movement between the first and second position, and/or any permanent intermediate position between the first and second position, is assigned to one of the two states of the electrical circuit.

3. The screen wiper arrangement according to claim 1, wherein the at least one screen portion comprises the electrically conductive element.

4. The screen wiper arrangement according to claim 1, wherein the one or more contact points are arranged at a first frame portion corresponding to the at least one screen portion in its closed state.

5. The screen wiper arrangement according to claim 1, wherein the electrically conductive element is an electrically conductive wire.

6. The screen wiper arrangement according to claim 1, wherein the electrically conductive element connects a first contact point and a second contact point arranged in operational connection with the at least one screen portion.

7. The screen wiper arrangement according to claim 1, wherein the electrically conductive element is a conductive path integrated in an electric window heater arranged at the at least one screen portion.

8. The screen wiper arrangement according to claim 1, wherein a voltage drop over a first and a second contact point has a lower value when the at least one screen portion is in its closed position and has a higher value when the at least one screen portion is in its open position or is moved to the open position or is moved to any intermediate position between the closed and open position of the at least one screen portion and kept there.

9. The screen wiper arrangement according to claim 8, wherein the electric circuit is closed when the at least one screen portion is in its closed position and open when the at least one screen portion is in its open position or is moved to the open position or is moved to any intermediate position between the closed and open position of the at least one screen portion and kept there.

10. The screen wiper arrangement according to claim 1, wherein a voltage drop over a first and a second contact point has a higher value when the at least one screen portion is in its closed position and has a lower value when the at least one screen portion is in its open position or is moved to the open position or is moved to any intermediate position between the closed and open position of the at least one screen portion and kept there.

11. The screen wiper arrangement according to claim 10, wherein the electric circuit is open when the at least one screen portion is in its closed position and closed when the at least one screen portion is in its open position or is moved to the open position or is moved to any intermediate position between the closed and open position of the at least one screen portion and kept there.

12. The screen wiper arrangement according to claim 1, wherein the electrically conductive element is an inductor.

13. The screen wiper arrangement according to claim 12, wherein the electric circuit comprises a radio frequency receiver or transceiver responsive to the inductor.

14. A construction machine comprising a screen wiper arrangement for a window screen according to claim 1.

* * * * *